No. 700,657. Patented May 20, 1902.
E. KEMPSHALL.
MANUFACTURE OF GOLF BALLS.
(Application filed Mar. 19, 1902.)
(No Model.)

Witnesses:
Ralph Lancaster
Fred. E. Maynard.

Inventor:
Eleazer Kempshall
By his Attorney
F. A. Richards.

UNITED STATES PATENT OFFICE.

ELEAZER KEMPSHALL, OF BOSTON, MASSACHUSETTS, ASSIGNOR TO THE KEMPSHALL MANUFACTURING COMPANY, A CORPORATION OF NEW JERSEY.

MANUFACTURE OF GOLF-BALLS.

SPECIFICATION forming part of Letters Patent No. 700,657, dated May 20, 1902.

Application filed March 19, 1902. Serial No. 98,977. (No model.)

*To all whom it may concern:*

Be it known that I, ELEAZER KEMPSHALL, a citizen of the United States, residing in Boston, in the county of Suffolk and State of Massachusetts, have invented certain new and useful Improvements in the Manufacture of Golf-Balls, of which the following is a specification.

This invention relates to playing-balls such as used in golf and certain other games; and its object is to increase the efficiency and durability of the ball, my improvements affecting more particularly the shell, which I form of a hard wear-resisting springy material—such, for instance, as celluloid—which, however, I render extremely tough and otherwise superior to a simple celluloid shell of the same thickness.

Figure 1:
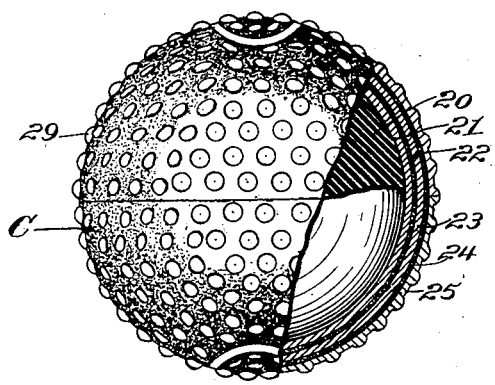
Figure 2:
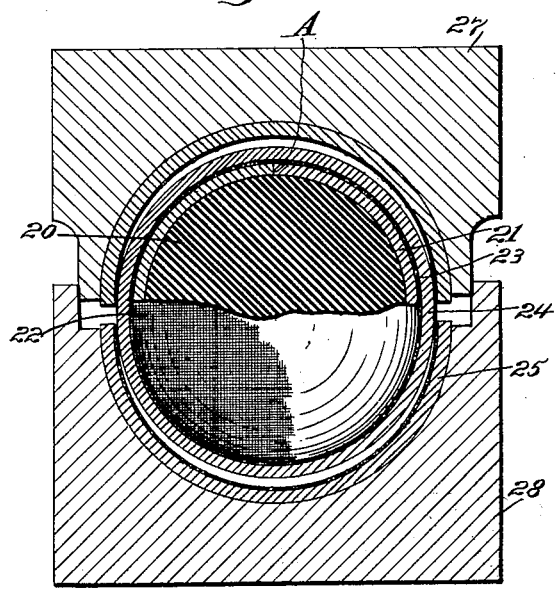
Figure 3:
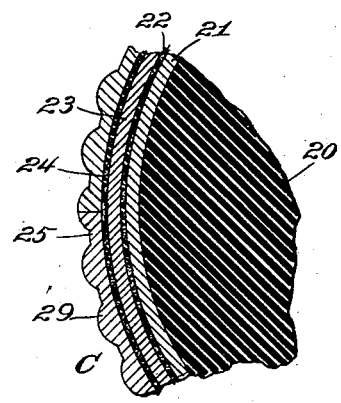

In the accompanying drawings, Figure 1 shows a ball made in accordance with my present improvements and partly broken away, so as to exhibit the construction. Fig. 2 illustrates one stage in the process of making a ball; and Fig. 3 is a fragmentary enlarged view illustrating the ball components.

In the several views similar parts are designated by similar characters of reference.

I form a core 20 of suitable material, such as gutta-percha or soft rubber, which may be a solid sphere or built up of different materials, being springy, so as to afford an elastic backing for the shell and also being of sufficient weight to enable the ball to carry well. This core I incase first with a shell or layer composed of a ply of celluloid and a ply of fabric, preferably woven. This two-ply shell may be formed of hemispherical segments, as indicated at Fig. 2, the celluloid being indicated at 21, the fabric at 22, and the joint between the segments at A. In forming the original shell segments or blanks I preferably combine the celluloid and fabric under heat and pressure, so that the celluloid permeates the meshes of the fabric, thereby making a very firm and tough blank. This shell celluloid-treated fabric I coat or incase in celluloid 23, this coating being preferably somewhat green or uncured. It may be applied either in the form of hemispherical segments or as a plastic coating, and in the latter case it may be hardened or cured after application. I then apply an outer shell or layer made of plies of fabric 24 and celluloid 25, the fabric being inside and the facing of celluloid thereon being intended to form the peripheral surface of the ball. The cloth and celluloid of this layer or blank may also be combined under heat and pressure, preferably so as to form hemispherical segments, Fig. 2, which are so placed that the joint or seam of the outer segments crosses, preferably at right angles, the seam A of the inner segments, thereby breaking joints and eliminating all liability of the shell bursting, since the joint of each layer is reinforced by the body of the other layer. The intermediate material or coating 23 may be applied, if desired, wholly or partially upon the inner surface of the outer shell or layer 25, one of its principal functions being to unite the layers, although it may be made of sufficient thickness to form a substantial and effectual part of the shell itself. The ball thus assembled is placed between forming and heating dies 27 and 28, which are then forced together, thereby joining intimately the edges of all of the segments, which, if desired, may be cemented. I prefer, however, to unite the segment edges by welding, and in order to do this effectually I make the original shell-blanks somewhat too bulky to fit in the closed dies, so that when the latter are brought together the shell is compressed, the heat rendering the celluloid sufficiently plastic to form the welds and finish the shell, as indicated at C, Fig. 1.

The intermediate coating or material 23 may be somewhat green, so that the solvent contained therein may become active when heated and permeate or affect the more thoroughly seasoned material 21 and 25, thereby rendering the latter more plastic. However, all of the celluloid used in the shell may be, if desired, in a somewhat green condition, within the scope of my invention, or all of the celluloid, including the portion 23, may be in a substantially uniform condition, if desired, so long as by the action of heat it may be rendered sufficiently plastic to enable it to mold under the pressure of the dies.

The core 20, forming the body of the ball, is highly resisting and prevents the thin composite shell from collapsing under the great pressure of the dies, and it will be understood that by reason of the compression of the shell between said dies and said core the material of the shell itself is highly solidified, the celluloid becoming hardened or tempered and toughened, so as to be adapted to withstand the rough usage to which the ball is subsequently subjected. By the same operation the celluloid is thoroughly incorporated with the fibers of the fabric, thus making a springy phenomenally strong celluloid and fabric shell. It will further be understood that by the compressing action of the dies the material of the shell itself is not only solidified, but the bulk of the elastic core 20 may also be somewhat reduced, so that said core is placed under permanent compression by the shell, the latter being retained in the dies until sufficiently cool to hold its shape in spite of the expansive action of the core, which constantly tends to recover its original bulk. The expansive tendency of the core aids in preserving the true spherical form of the shell and also in restoring the shape of the same instantly when distorted by a blow, thus increasing the carrying power of the ball.

One of the important features of the improvement lies in building up a shell by means of thin layers of celluloid alternating with fabric, whereby owing partly to the permeation of the celluloid through the meshes of the fabric I get the advantage of a simple thick celluloid shell. Further, since a thin plate is superior in quality to a thick plate of celluloid it will be seen that by combining in a practical manner a plurality of thin celluloid plates I give a relatively thick shell the advantages of thin plates as to temper, toughness, durability, &c. The layers of fabric, especially when woven, compensate for or overcome the usual brittleness of the celluloid, a composite shell of the kind herein described not being easily cracked or chipped. In fact if the outer layer of celluloid be very thin and well incorporated into the fabric chipping becomes practically impossible. The presence of the fabric does not impair the springiness of the shell, since the fabric itself is yielding and also since there is a large amount of celluloid in the composite shell as compared with the amount of fabric. In fact the presence of the fabric conduces to the springiness of the shell, since it tends to prevent the latter from being indented sharply at any point, so that when the ball is struck by an implement not only the point of contact, but also the portion of the shell surrounding said point, is flexed, thereby affecting a large area of the resisting springy core within the shell. Hence neither the shell nor the core is unduly distorted by a blow, so that little force is absorbed in changing and restoring the shape of the ball, while owing to the large proportion of the core affected great energy is brought to bear in restoring the shape of the ball, thereby causing it to spring from the implement with phenomenal speed. The ball possesses the further advantage that it is not injuriously affected by either hot or cold weather, the celluloid being subjected at the finishing operation to a heat far in excess of that of the hottest summer day and the incorporation of fabric in the shell insuring the same against cracking by reason of cold weather, especially since the fabric is near to the surface of the shell. It will further be understood that the shell is sufficiently resisting to enable the ball to be driven a short distance by a light blow without affecting the resilient core, giving the action of a dead ball, while under a heavier blow the shell is flexed and the energy of the imprisoned mass is brought into play, with the result that the ball flies a long distance. My improvements may, however, be applied in building up a shell of other material than celluloid in combination with a ply or plies of tough material, especially where one or more of the layers or blanks consist of joined segments.

I usually make the surface of golf-balls pebbled or brambled, as at 29, Fig. 1, although balls intended for other games may be otherwise finished.

In using herein the term "celluloid" I do not limit myself to any particular compound of the celluloid or pyroxylin class. It is not essential always that all or any of the plies or layers whereof the shell is built up be applied in the form of segments.

The herein-described playing-ball is made the subject-matter of my Patent No. 696,891, of April 1, 1902.

Having described my invention, I claim—

1. A process in producing a playing-ball, consisting in inclosing a core of springy material in previously-formed spherical segments of fabric and plastic material, providing said segments with a cementing-coat, placing over said coating an outer layer of spherical segments, bringing said plastic material to a plastic condition, subjecting the whole to compression, and maintaining the compression while the shell hardens.

2. A process in producing a playing-ball, consisting in inclosing a core of springy material in previously-formed spherical segments of fabric and plastic material, providing said segments with a cementing-coat, said segments being so placed that the joint in one layer runs crosswise of the joint in the other layer, bringing the plastic layers to a plastic condition, and subjecting the whole to compression.

3. A process in producing a playing-ball, consisting in inclosing a core of springy material in previously-formed spherical segments of fabric and seasoned celluloid, coating said segments with a layer of green celluloid, placing over said coating an outer layer consisting of spherical segments of celluloid and fabric, heating said layers, subjecting the whole to compression, and maintaining the compression while the shell hardens.

4. A process in producing a playing-ball, consisting in inclosing a core of springy material in previously-formed spherical segments of celluloid and fabric, covering said segments with a layer of celluloid, placing thereover a layer consisting of spherical segments of celluloid and fabric, subjecting the whole to heat and compression, and maintaining the compression while the celluloid cools and hardens.

5. A process in producing a playing-ball, consisting in inclosing a core of springy material in previously-formed spherical segments of seasoned celluloid and fabric, coating said segments with a layer of green celluloid, placing over said coating an outer layer consisting of spherical segments of celluloid and fabric, the joint or seam in one layer running crosswise of the joint or seam in the other layer, heating said layers, and subjecting the whole to compression.

6. A process in producing a playing-ball, consisting in applying layers of celluloid and woven fabric to a core of springy material, subjecting the ball thus formed to heat and compression, and maintaining the compression while the shell hardens by cooling.

7. A process in producing a playing-ball, consisting in applying successive layers, each consisting of fabric and plastic material, upon a spherical core, cementing said layers together, and subjecting the whole to compression.

8. A process in producing a playing-ball, consisting in applying layers of plastic material and woven fabric to a core of springy material, subjecting the ball thus formed to heat and compression, and maintaining the compression while the shell hardens by cooling.

9. A process in producing a playing-ball, consisting in applying successive layers of fabric and celluloid upon a spherical core, cementing said layers together, and subjecting the whole to heat and compression.

10. A process in producing a playing-ball, consisting in forming a plurality of sets of hemispherical segments of celluloid and fabric, placing said segments upon a core of springy material so as to form a plurality of alternating celluloid and fabric layers, subjecting the whole to heat and compression, and maintaining the compression while the shell hardens by cooling.

11. A process in producing a playing-ball, consisting in forming hemispherical segments of celluloid and fabric, placing said segments upon a core of gutta-percha so as to form a plurality of layers, the joint or seam in one layer crossing a joint or seam in another layer, placing an incompletely-cured coating of celluloid between said layers, subjecting the whole to heat and compression to an extent to compress said core, and maintaining the compression while the shell cools and hardens.

12. A process in producing a playing-ball, consisting in inclosing a core in a shell composed of successive layers of plastic material and fabric, at least one of said layers being previously formed and consisting of spherical segments, bringing the plastic layers to a plastic condition, subjecting the whole to compression, and maintaining the compression while the shell hardens.

13. A process in producing a playing-ball, consisting in inclosing a core in previously-formed sets of hemispherical segments of plastic material compounded with fabric, so as to make a shell consisting of a plurality of layers, the segments being so placed that the joint in one layer crosses the joint in another layer, and subjecting the ball thus formed to heat and compression.

14. A process in producing a playing-ball, consisting in inclosing a core in previously-formed sets of segments of plastic material and fabric, so as to make a shell, the segments being so placed that the joint in one layer crosses the joint in another layer, heating the plastic material, subjecting the whole to compression so as to weld the segments together at their edges, and maintaining the compression while the shell cools and hardens.

15. A process in producing a playing-ball, consisting in inclosing a core in layers previously compounded of celluloid and fabric, at least one set of said layers consisting of spherical segments, subjecting the whole to heat and compression, and maintaining the compression while the shell hardens.

16. A process in producing a playing-ball, consisting in inclosing a core in previously-formed layers each consisting of segments of celluloid and fabric, the segments being so placed that the joint in one layer crosses the joint in another layer, and subjecting the ball thus formed or assembled to heat and compression.

17. A process in producing a playing-ball, consisting in inclosing a core of springy material in shell layers, at least one of said layers being previously formed and consisting of spherical segments of plastic material and fabric, bringing the plastic material to a plastic condition, subjecting the whole to compression to such an extent as to compress said core, and maintaining the compression while the shell hardens.

18. A process in producing a playing-ball, consisting in inclosing a core consisting largely of gutta-percha in layers each consisting of previously-formed segments of plastic and textile material, the segments being so placed that the joint in one layer crosses the joint in another layer, subjecting the ball thus formed or assembled to heat and also compression to such an extent as to compress said core, and maintaining the compression until the shell cools.

19. A process in producing a playing-ball, consisting in inclosing a core of gutta-percha in shell layers of celluloid and fabric, at least one of said layers being previously formed and consisting of spherical segments, heating the celluloid, subjecting the whole to compression, and maintaining the compression while the celluloid cools and hardens.

20. A process in producing a playing-ball, consisting in inclosing a core of gutta-percha in previously-formed segments consisting of both celluloid and fabric so as to make a shell consisting of a plurality of layers, the segments being so placed that the joint in one layer crosses the joint in another layer, and subjecting the ball thus formed or assembled to heat and compression, so as to weld the segments at their edges.

21. A process in producing a playing-ball, consisting in inclosing a springy core, in previously-formed spherical segments compounded of fabric and celluloid, coating said segments with cement, placing over said coating an outer layer of spherical segments of fabric and celluloid, and subjecting the whole to heat and compression.

22. A process in producing a playing-ball, consisting in inclosing a core with a shell built up of fabric and celluloid, heating and compressing the shell, and maintaining the compression while the shell cools.

23. A process in producing a playing-ball, consisting in inclosing a yielding core in a shell composed of at least two layers of celluloid and at least one intervening layer of woven fabric, and heating and compressing the shell.

ELEAZER KEMPSHALL.

Witnesses:
B. C. STICKNEY,
JOHN O. SEIFERT.